(12) United States Patent
Götz et al.

(10) Patent No.: US 8,289,812 B2
(45) Date of Patent: Oct. 16, 2012

(54) ACOUSTIC DETERRENCE

(75) Inventors: Thomas Götz, Fife (GB); Vincent M. Janik, Fife (GB)

(73) Assignee: The University Court of the University of St. Andrews, St. Andrews, Fife (GB)

( * ) Notice: Subject to any disclaimer, the term of this patent is extended or adjusted under 35 U.S.C. 154(b) by 240 days.

(21) Appl. No.: 12/596,337

(22) PCT Filed: Apr. 7, 2008

(86) PCT No.: PCT/GB2008/050245
§ 371 (c)(1),
(2), (4) Date: Jan. 21, 2010

(87) PCT Pub. No.: WO2008/129313
PCT Pub. Date: Oct. 30, 2008

(65) Prior Publication Data
US 2010/0110838 A1     May 6, 2010

(30) Foreign Application Priority Data
Apr. 20, 2007 (GB) .................................. 0707640.9

(51) Int. Cl.
*H04B 1/02* (2006.01)
(52) U.S. Cl. ....................................................... 367/139
(58) Field of Classification Search .................... 367/139
See application file for complete search history.

(56) References Cited

U.S. PATENT DOCUMENTS
4,922,468 A    5/1990   Menezes
(Continued)

FOREIGN PATENT DOCUMENTS
GB    2434070 A    7/2007
(Continued)

OTHER PUBLICATIONS

J. R. Nedwell, B. Edwards, A. W. H. Turnpenny and J. Gordon, "Fish and Marine Mammal Audiograms: A summary of available information". Subacoustech Ltd, 281 pp. 3 Sep. 2004.*

(Continued)

*Primary Examiner* — Isam Alsomiri
*Assistant Examiner* — James Hulka
(74) *Attorney, Agent, or Firm* — Drinker, Biddle & Reath, LLP

(57) ABSTRACT

A method and system of deterring mammals is disclosed involving incurring an acoustic startle response comprising the steps of selecting a target order, family, genus or species to be deterred, selecting a received level that is a predetermined level above a representative hearing threshold of the targeted mammals, and, taking transmission loss into account, transmitting an acoustic signal at a source level required to create the selected received level at a predetermined distance from the transmission point. The acoustic signal may comprise frequency components at which the aural sensitivity of the targeted mammals is greater than that of selected other animals, preventing the disturbance of the selected other animals while deterring the targeted mammals. In addition, a secondary conditioning sound may be played prior to the main acoustic signal to condition the mammals to avoid the main stimulus. Furthermore, using the same steps, an aversive stimulus may be played that elicits an avoidance without a startle reflex. The characteristics of these aversive sounds are those found to be unpleasant to humans. Accordingly, the aversive sound is selected to have one or more of the following psychophysical features: high roughness; low tonality; high loudness; high sharpness.

27 Claims, 6 Drawing Sheets

U.S. PATENT DOCUMENTS

| | | | |
|---|---|---|---|
| 5,559,759 A | 9/1996 | Gerstein et al. | |
| 5,570,322 A | 10/1996 | Miller | |
| 5,610,876 A * | 3/1997 | Jeffers | 367/139 |
| 5,627,801 A * | 5/1997 | Saunders | 367/139 |
| 5,883,858 A * | 3/1999 | Holt | 367/139 |
| 6,250,255 B1 * | 6/2001 | Lenhardt et al. | 119/713 |
| 2002/0131472 A1 * | 9/2002 | Draxton et al. | 374/115 |
| 2003/0058740 A1 | 3/2003 | Jincks | |
| 2004/0008581 A1 | 1/2004 | Nadeau | |
| 2004/0076080 A1 * | 4/2004 | Niezrecki et al. | 367/139 |
| 2004/0175011 A1 * | 9/2004 | Schaub | 381/316 |
| 2004/0196998 A1 * | 10/2004 | Noble | 381/331 |
| 2005/0004711 A1 * | 1/2005 | Hirose | 700/265 |
| 2005/0062604 A1 * | 3/2005 | Fong et al. | 340/539.23 |
| 2005/0232083 A1 * | 10/2005 | Borsina et al. | 367/139 |
| 2005/0232084 A1 * | 10/2005 | DiNapoli | 367/139 |

FOREIGN PATENT DOCUMENTS

| | | |
|---|---|---|
| WO | WO 95/00016 A | 1/1995 |
| WO | WO 98/03062 A | 1/1998 |

OTHER PUBLICATIONS

I. J. J Hirsh, R. C. Bilger, and W. Burns., "Auditory- Threshold Recovery after Exposures to Pure Tones", J. Acoust. Soc. Am. vol. 27, Issue 5, pp. 1013.*

Michael Koch, Hans-Ulrich Schnitzler, "The acoustic startle response in rats-circuits mediating evocation, inhibition and potentiation", Behavioural Brain Research, vol. 89, Issues 1-2, Dec. 1997, pp. 35-49.

* cited by examiner

US 8,289,812 B2

ACOUSTIC DETERRENCE

BACKGROUND

The present invention relates to acoustic deterrence, and in particular to an acoustic deterrent device and methods for deterring mammals, most particularly but not exclusively marine mammals.

Worldwide, farming of marine and diadromous finfish species has experienced tremendous growth rates, showing a ten fold increase over the last three decades. This increase in potential food resources presented in a marine environment has brought about increased interactions with predatory species. One common group of predators is marine mammals who exploit food resources depending on their profitability and potential costs, which include dive depths as a major factor. The shallow depth of fish farms thus makes them particularly attractive to predators.

In particular, predatory behaviour of pinnipeds is a major concern, causing a variety of economical and market related risks for the fish farm owner. Accordingly, there is much interest in developing anti-predator control methods.

These methods include net modifications, lethal or non-lethal removals, population control and aversive conditioning. However, each of these methods has their own drawbacks. For example, the addition of a second net can cause tangling of predators and non-predatory species; and lethal removals as well as population control may have an impact on populations and raise ethical concerns over the treatment of the animals. Culling of higher order predators can also have negative impact on predation rates by other predators, for example, pinnipeds forage on predatory fish species around the net pen which in turn potentially feed on aquaculturally important species. Also, emetic aversion conditioning requires that individuals learn to associate treated fish with sickness, and this can be hard to achieve when predator numbers are high.

One anti-predator control method that avoids these pitfalls is the use of acoustic deterrent devices (ADDs). These have traditionally been considered to be a benign solution. However, they do present certain problems with respect to the effects they have on other marine wildlife and with habituation, where a target species motivated by a food source ceases to be deterred by the acoustic signals.

The acoustic power, also referred to as source level, of the ADDs can cause temporary or permanent hearing damage both to the targeted species and to other wildlife, and the noise pollution is in general an environmental hazard. Further, both targeted and non-targeted species can be excluded from their natural habitat within a wide radius of the fish farms. These concerns have led some governments to restrict or even ban the use of ADDs.

A further problem is the habituation of the target species to the sound. In extreme cases, the sound which is intended to be aversive acts as a "dinner bell" and actually serves to attract predators, rather than deter them. Also, if predator sounds are used as an aversive noise, habituation is dangerous for the target species once they had returned to their normal habitat.

Also, existing power levels and signal cycles impose heavy duty cycles on the batteries used as power sources in the transducer units.

Accordingly, it would be desirable to provide an acoustic deterrent device that is highly effective, but does not damage the environment is species specific and avoids habituation.

SUMMARY

According to a first aspect of the present invention there is provided a method of deterring mammals comprising incurring an acoustic startle response.

"Deterring" is taken to mean discouraging or preventing a mammal from entering into or staying in a particular area. The startle response is a physiological reflex in mammals to sound levels which often initiates flight from the sound.

Preferably, the method of incurring an acoustic startle response comprises the steps of:
  selecting a target order, family, genus or species of mammals to be deterred;
  selecting a received level at a predetermined level above a representative hearing threshold of the targeted mammals;
  transmitting an acoustic signal from a transmission point at a source level required, taking into account transmission loss, to create the selected received level at a predetermined distance from the transmission point.

Preferably, the predetermined level is between 90 and 125 dB re 1 µPa above the representative hearing threshold at each frequency.

Preferably, the acoustic signal has a duration about as long as the acoustic integration time specific to the targeted mammals auditory system Preferably, the acoustic signal has a duration of less than 200 ms.

Preferably the acoustic signal has a rise time of less than 20 ms.

Preferably, the acoustic signal is as broadband as possible within the designated frequency range.

Preferably, the acoustic signal comprises frequency components at which the aural sensitivity of the targeted mammals is greater than that of selected other animals.

Preferably, the acoustic signal uses a frequency band between 500 Hz and 2 kHz for the deterrence of seals or other pinnipeds. The acoustic signal is preferably as broadband as possible within this frequency range.

Preferably, the mammals to be deterred comprise sea mammals including pinnipeds, most preferably seals; or cetaceans.

Alternatively, the mammals to be deterred comprise land mammals.

Preferably, a secondary conditioning sound is made to condition the mammals to avoid the main stimulus. This could be a sound of centre frequency 1 KHz, modulation rate 250 Hz and duration 1.2 seconds with two modulation cycles.

Preferably, the conditioning sound is played between 500 ms and 5 s before the main acoustic signals on selected occasions.

According to a second aspect of the invention, there is provided a method of deterring marine mammals comprising transmitting an acoustic signal which comprises an aversive sound whose characteristics are chosen based on characteristics that are unpleasant to humans.

Preferably, the aversive sound is selected to have one or more of the following psychophysical features: high roughness; low tonality; high loudness; high sharpness.

Preferably a frequency modulation is applied to the carrier signal, most preferably with a modulation frequency of about 70 Hz.

This frequency modulation is applied in order to achieve high roughness.

Preferably, the frequency modulation has a modulation depth of between 10 and 150%, preferably 50% of the centre frequency of the carrier signal.

Preferably, the aversive sound has a sound pressure level of at least 70 dB above the hearing threshold of the targeted mammals, most preferably at least 80 dB above the hearing threshold of the targeted mammals.

Preferably, an aversive sound is of a complex form and comprises partials that fall within 25% of the critical bandwidth of the hearing system of the targeted mammals.

Preferably, when cetaceans are to be deterred the acoustic signals could be close to the upper frequency edge of the hearing range in order to increase sharpness.

Preferably, the acoustic signal is as broadband as possible within the selected frequency band in order to increase loudness without increasing the actual sound pressure level.

Preferably, the aversive sound comprises frequency components at which the aural sensitivity of the targeted mammals is greater than that of selected other animals.

Preferably, the acoustic signal comprises one or more frequency components between 500 Hz and 2 kHz for the deterrence of seals or other pinnipeds.

Preferably, sound exposure time is determined based on a sound exposure level below that which causes a temporary threshold shift in the target and non-target species, for example an energy flux density of 120 dB re 1 $\mu Pa^2 s^{-1}$ above the hearing threshold of the targeted mammals.

According to a third aspect of the present invention there is provided an acoustic deterrent device comprising a signal transducer arranged to transmit acoustic signals in accordance with the method of the first aspect and/or the method of the second aspect.

According to a fourth aspect of the present invention there is provided an acoustic deterrent system comprising a control unit, a power source, amplifier and transducer means, co-operable to perform the method of the first aspect and/or the method of the second aspect.

According to a fifth aspect of the invention there is provided control software executable on a computer so that the computer is operable as the control unit of the fourth aspect.

The control software can be provided recorded on a computer readable medium, or made available for download.

According to a sixth aspect of the present invention there is provided an acoustic signal which incurs a startle response in mammals in order to deter them. The acoustic signal can be produced and used in accordance with any of the previous mentioned aspects.

According to a seventh aspect of the invention there is provided an acoustic signal for the deterrence of mammals which comprises an aversive sound whose characteristics are chosen based on characteristics that are unpleasant to humans. The acoustic signal can be produced and used in accordance with any of the previous mentioned aspects.

BRIEF DESCRIPTION OF THE DRAWINGS

The present invention will now be described, by way of example only, with reference to the accompanying figures in which.

DETAILED DESCRIPTION

A variety of Acoustic Deterrent Devices (ADDs) are available to reduce or stop predation of pinnipeds on finfish farms. These include for example the Ferranti-Thomson Mk2, Mk3 and 4× Seal scrammers, the Ace-Aquatec "silent scrammer", the Airmar Technology Corporation dB Plus II, the Terecos Limited type DSMS-4 and the Lofitech "universal scarer" or "seal scarer".

Figure 1:
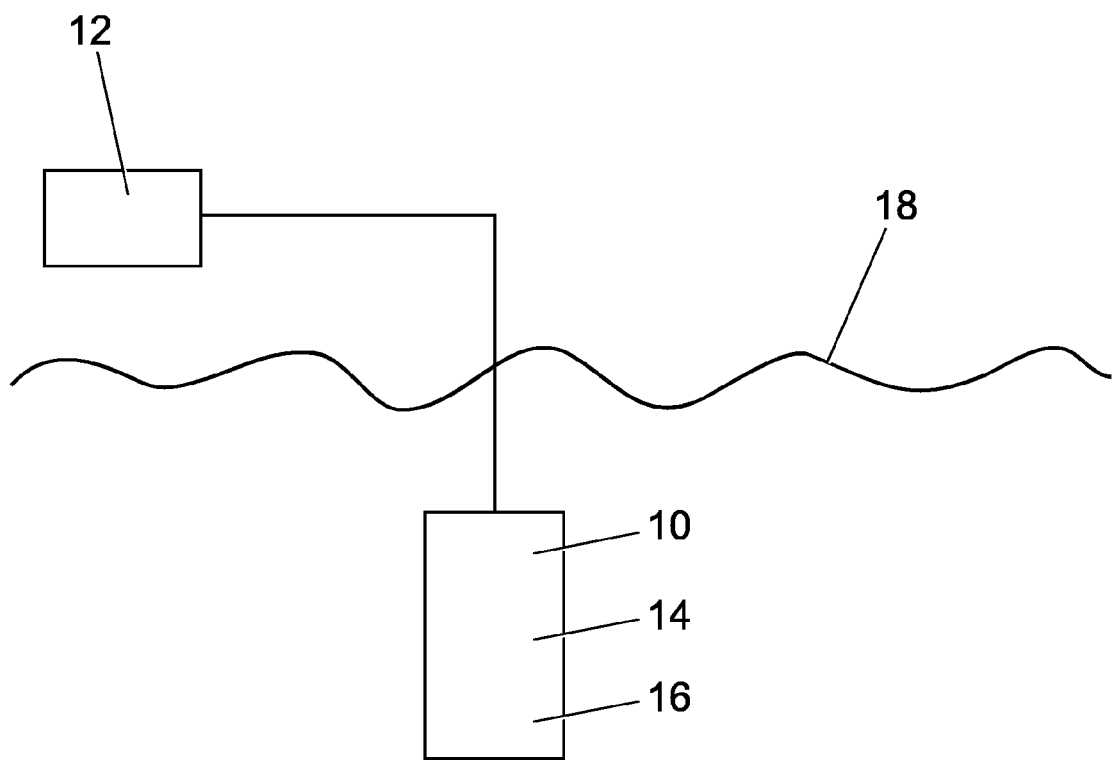
FIG. 1 shows an acoustic deterrent system.

As seen in FIG. 1, an ADD comprises a power source 10 (usually marine batteries), a control unit 12, an amplifier 14 and an underwater transducer (speaker) 16. The embodiment shown in FIG. 1 shows all of the power source, amplifier and transducer being below the water surface 18, but it will be appreciated that any suitable arrangement of these components can be used, for example one or more of the power source and amplifier may be situated remote from the transducer 16 and as such could be above the surface 18, or as a further example, all the components could be underwater, not just the transducer.

The control unit 12 typically includes a computer that has a number of sound files stored on it which generate signals to be relayed through the amplifier 14 and broadcasted into the water. The control unit 12 also controls the timing of the sounds which are played.

Sound being played is characterised by its source levels, rise time, frequency composition and duration. Additionally, the inter-sound interval determines how quickly sounds follow each other.

The "source level" (SL) is a measurement of the acoustic output of the device at 1 m distance. In the following text, source levels and received levels in general will be denoted in units of decibels (dB) measured with reference to 1 $\mu$Pa, unless a specific statement or context implies otherwise. The "rise time" is a measure of how long it takes for an acoustic signal or pulse to reach its maximum amplitude. The term sensation levels refers to the sound pressure level by which a stimulus exceeds the species' auditory threshold (received level minus hearing threshold). Received level refers to the sound pressure level that reaches the animal's ears (source level minus transmission loss). The term sound exposure level (SEL) refers to the energy flux density (being a function of sound pressure level and exposure time) and is given by SEL=SPL+10 $\log_{10}$ (exposure time) where SPL is the sound pressure level of a received sound.

When designing an acoustic deterrent device there are various factors that must be taken into account, including ecological impacts (on both target and non-target species), and problems and potential solutions.

Ecological Impacts

Species of Concern

Any animal that can perceive acoustic sounds can be potentially adversely affected by them. These affects can be wide ranging. For example, the Ferranti-Thomson 4×ADD has a power of over 200 dB re 1 $\mu$Pa at 25 KHz and the signals from this device can be audible to a harbour porpoise (*Phocoena phocoena*) for up to 10 km. The zone of potential audibility for a harbour seal for a 175 dB re 1 $\mu$Pa source is thought to lie between approximately 1.4 km and 2.9 km.

Hearing Damage

ADDs could cause hearing damage to target species and to non-target species, which leads to adverse effects on individual animals and the population in general. Hearing damage would also reduce the potential efficiency of the ADD as it would become less audible to the affected predators.

Hearing damage first occurs as a temporary shift of the hearing threshold (TTS) that is fully recoverable after a few hours or days. However, exposure to higher intensity or longer duration acoustic stimuli can cause chronic damage and lead to a permanent threshold shift (PTS). In its mildest form this permanent hearing damage only affects the outer hair cells of the auditory system. This leads to a very subtle rise of the hearing threshold, but also destroys the cochlea amplifier causing a diminishing of the dynamic range and a loss of the ability to discriminate between frequencies.

Hearing damage in any form is a function of sound pressure level (SPL) and exposure time. A sound with a short duration can be safely presented at a higher SPL than a longer one. It has been suggested that stimuli of equal acoustic energy cause similar damage. The sound exposure level (SEL) or energy flux density has been suggested as a measure for defining safe exposure levels, where SEL=SPL+10 $\log_{10}$ (exposure time). However, data on terrestrial mammals seems to suggest that the equal energy criterion underestimates the risk of hearing damage, at least for sound pressures close to a critical level of about 135 dB above the hearing threshold.

No direct measurements of PTS are available for marine mammals, so conclusions have to be drawn based on extrapolation from TTS data or human damage risk criteria (DRC).

Temporary Threshold Shift (TTS)

Studies on odontocetes have found that sound exposure levels between 193 and 213 dB re 1 $\mu Pa^2 s^{-1}$ can cause mild to moderate, but fully recoverable TTS. These values are about 116-132 dB re 1 µPa above the hearing threshold of the tested individuals. It has also been suggested that a sound exposure level can be expressed in terms of energy flux density levels in some situations.

Studies on odontocetes have been used to estimate TTS ranges of ADDs for single transmissions (i.e. short pulses) based on equal energy assumptions. Given these assumptions an Airmar dB Plus II device (having a source level of 192 dB re 1 µPa) would only cause TTS in bottlenose dolphins at distances closer than 1 m while a high power (200 dB re 1 µPa) Ferranti-Thomson 4x device would have a TTS zone of about 2-3 meters. TTS zones for the harbour porpoise would be 2-3 and 14-25 meters respectively.

These TTS zones widen markedly for longer exposure times. Exposure to 10 seconds of a sound at a level of 194 dB re 1 µPa (which is equivalent to the energy of a 20 second scram produced by an Ace-Aquatec or Ferranti-Thomson Mk 2 type device) is thought to result in TTS zones of 150 m for harbour porpoises, 285 m for bottlenose dolphins and 577 m for killer whales, while a harbour seal TTS zone would be around 11 m at a conservative estimate.

Permanent Threshold Shifts (PTS)

Human damage risk criteria (DRC) states that PTS will be caused at or after a critical value of 130 dB above the hearing threshold. Studies of terrestrial mammals have confirmed that such hearing damage occurs quickly when exposed to sound pulses at 130-140 dB above the hearing threshold. Available data on harbour porpoises suggests that a PTS damage zone for harbour porpoises would be 30 m, with a similar result for killer whales (*Orcinus orca*).

Extrapolation of thresholds or PTS from TTS data is problematic, but due to a lack of direct measurements in marine mammals and the difficulties of extrapolation from human DRC such an attempt is justified. Data on humans suggests that exposure levels causing TTS of 40 dB or more carry some risk of causing a PTS. A temporary threshold shift that exceeds 40 dB carries some risk to become permanent and correlates with an increase of the sound exposure pressure level by 20 dB beyond the sound pressure level that causes onset TTS). Based on these considerations the damage zones within which PTS could occur would be 16 m, 31 m and 69 m for the bottlenose dolphin, harbour porpoise and killer whale respectively.

Longer term exposure (meaning anything at or above 1.5 minutes per day) requires different calculations to be made. Using a PTS damage threshold of 110 dB above the hearing threshold for exposures of up to 1.5 minutes yields PTS ranges between 69 m and 562 m for a high powered device (200 dB re 1 µPa at 1 m) and values between 40 m and 281 m for a 194 dB re 1 µPa ADD depending on the species' hearing thresholds.

Long term exposure over months or years requires even more conservative criteria. Accepted noise levels at human industrial workplaces are 85 dB above the hearing threshold zone. An even more conservative 80 dB threshold would be exceeded within a zone of over a kilometer radius for the Airmar dB Plus II device which has a source level of 192 dB re 1 µPa. In areas with dense fish farming activity, animals could be exposed to these levels for extensive amount of time. As studies on humans have shown, initially harmless TTS can turn into PTS if recovery periods are insufficient or nonexistent.

Hearing in fish is less well studied in general. However, fish are sensitive to lower frequencies than pinnipeds or cetaceans and studies on fish have been carried out using signals with frequencies of 500 Hz or less, which is within the most sensitive hearing range of fish. This makes it difficult to draw conclusions about the effects of higher frequency signals. However, increasing TTS with increasing exposure levels and weak temporary shifts have been demonstrated in some studies.

Masking

It is important that the sounds produced by ADDs do not overlap with communication or echolocation sounds used by target or non-target mammals.

For a signal to be masked the detection of the signal must be influenced by a second sound—the masker, which will usually be centred at the frequency of the signal. It has been well established that the masking effect is dependent on the bandwidth of the masker until it reaches a so-called critical bandwidth. Therefore, noise only masks a signal if it contains similar frequencies to the signal of interest. Critical bandwidths in marine mammals are generally below 10% of the signal centre frequency.

Additionally, masking effects are attenuated if the masker and the signal come from different directions. In harbour seals minimum distinguishable audible angles for clicks are 4.5 degrees, and in bottlenose dolphins they are less than 3 degrees. Therefore, it seems that cetaceans and pinnipeds may successfully avoid masking effects, but the potential to affect other marine mammal communication networks is high.

Little is known about the impacts of masking on fish. However, their hearing abilities are generally less sophisticated than those of mammals which could make them more prone to masking effects.

Habitat Exclusion

As mentioned above, ADDs for seals have been shown to exclude non-target marine mammals (i.e. cetaceans) from their habitat. This has been confirmed by several studies.

Problems and Solutions
Duty Cycles

If an existing ADD is used continuously, noise pollution is substantial. Duty cycles range from 3% in a Ferranti-Thomson model up to 50% in other designs.

Devices can include additional predator detectors so that the ADD is only triggered when a predator is present. This can be via direct detection of a predator, or from the analysis of the motion patterns of fish in the pens of the fish farm. Such systems are desirable and can be incorporated in combination with the invention.

Frequency Bands

Figure 2:
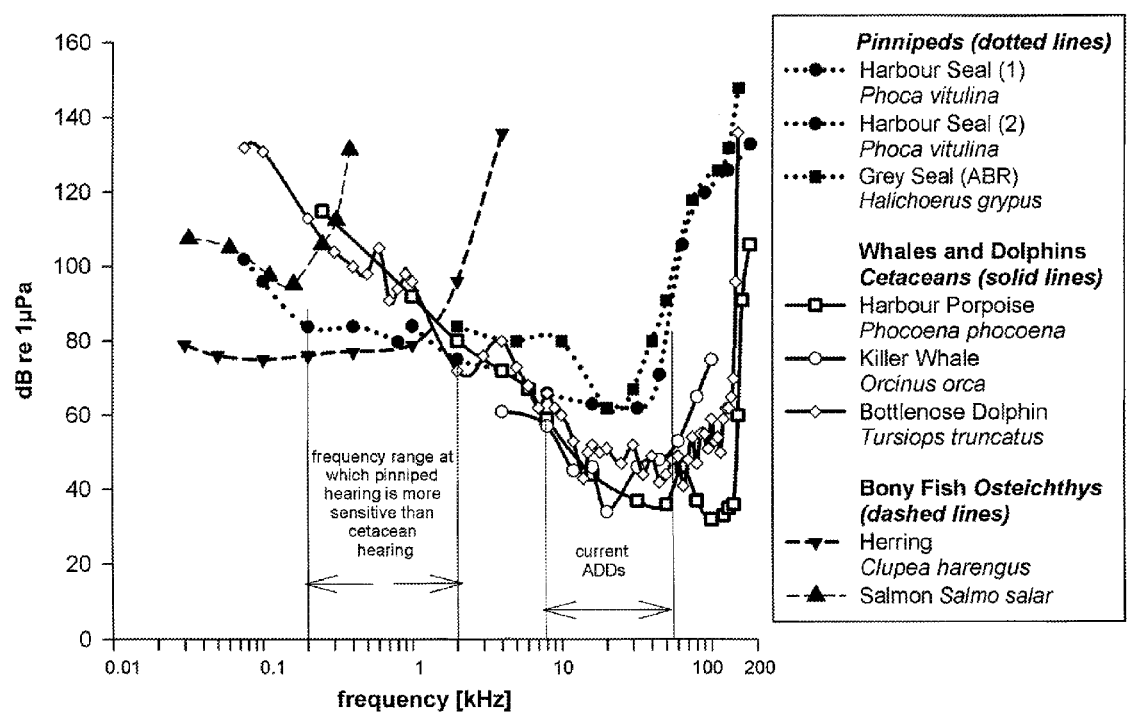
FIG. 2 shows the graph of hearing thresholds for selected animals.

FIG. 2 shows the hearing thresholds for a spectrum of marine wildlife measured in dB with respect to 1 µPa plotted on the Y axis, against frequency in KHz on the logarithmic X axis.

Existing ADDs use frequencies above 4 KHz, at which odontocetes' hearing is generally more sensitive than pinnipeds' hearing. Thus odontocetes perceive a sound of a given SPL as louder than seals do.

Discomfort levels for a captive harbour seals and harbour porpoises have been investigated and it has been found that for a frequency of 12 KHz, harbour porpoises avoid sound that is approximately 5 dB quieter than that avoided by harbour seals. This corresponds to the difference between the hearing thresholds of both species at the relevant frequency.

Some ADDs operate at frequencies close to the most sensitive hearing of pinnipeds, that is between 20 and 30 KHz. However, these frequencies are not suitable because hearing thresholds in odontocetes are even lower in this band. Furthermore, most odontocetes have their most sensitive hearing in the ultrasonic range between 30 and 50 KHz. It would therefore be desirable that no ADD should produce substantial energy above 20 KHz. However, this is the case for the majority of available ADDs.

In a frequency band between 200 Hz and 2 KHz pinnipeds' hearing is more sensitive than odontocetes' hearing and thus appears to be an ideal frequency band for ADDs. This frequency band has not been previously used for pinniped ADDs because it is below the frequencies at which their hearing is most sensitive. However, the inventors have realised that the use of this apparently non-optimal frequency band enables an ADD to have an effect on pinnipeds without adversely affecting cetaceans and odontocetes.

This is a specific example of the inventors' more general realisation that the frequency components for an ADD can be chosen to lie at values at which the aural sensitivity of the targeted mammals is greater than that of selected other animals, even at the expense of using the frequencies corresponding to the lowest hearing thresholds of the targeted mammals.

The lower frequencies (i.e. 500 Hz to 2 kHz in the seal example) may have effects on fish with specialised hearing (such as clupeids) and baleen whales and further research may need to be carried out to quantify this. However, fish species with specialised hearing and most baleen whales do not usually occur around fish farm locations and so this is not anticipated to be a problem when the invention is used in a fish farm environment.

Perception of Received Sound Pressure Levels

The general paradigm applied in current ADDs is that a high source level is expected to cause physical discomfort or pain and therefore results in an animal leaving an area. However, there are several problems involved when operating at the upper end of the dynamic range of an animal.

Figure 3:
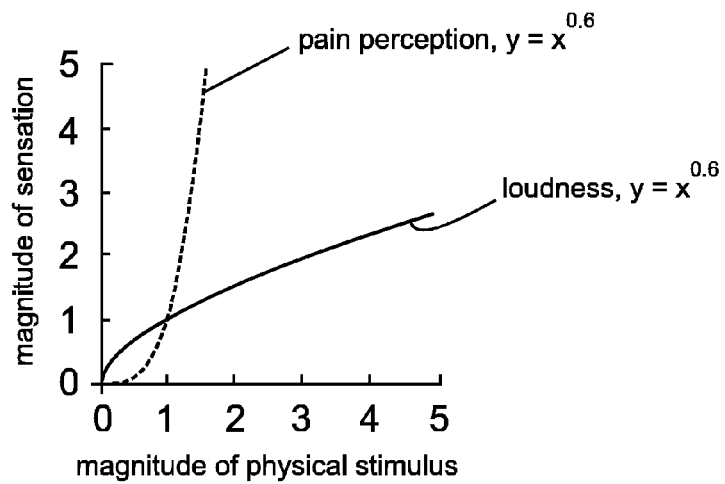
FIG. 3 shows a representation of Stevens Law.

FIG. 3 shows a qualitative representation of Steven's Law where the magnitude of sensation is plotted against a magnitude of physical stimulus for a sound. Two curves are shown, one shows the loudness of a sound while the other shows the pain perception.

Steven's Law gives an approximate model for the general relationship for the magnitude of sensation, $\Psi$, and the magnitude of a physical parameter, $\phi$, as follows:

$$\Psi = k(\phi - \phi_0)^m$$

k is a constant, and $\phi_0$ is the lowest perceivable physical stimulus (threshold) and m is a modality specific coefficient determining the essential shape of the function. In the human auditory system, m is equal to 0.6 (this value is illustrated in FIG. 3).

It can be seen that, as a generalisation, adding a defined sound pressure value (in Pascals) to the high sound pressure stimulus leads only to a small increase of the perceived loudness while adding the same sound pressure value to a low sound pressure stimulus would lead to a stronger increase in perceived loudness. Thus, an increase in sound pressure in the upper range of the curve in FIG. 3 disproportionately increases the risk of damaging the auditory system without yielding a much stronger aversive effect.

The perceived loudness of a sound is generally measured on the sone scale, a doubling of which reflects a doubling of perceived loudness. One sone is defined as a sound that is perceived as equally loud as a 40 dB re 20 µPa tone at 1 kHz in air for humans. The perceived loudness in sone (L) can be calculated by the equation: $L = 0.01 (p - p_0)^{-0.6}$, where p is the sound pressure in µPa and $p_0$ is the effective threshold.

Figure 4:
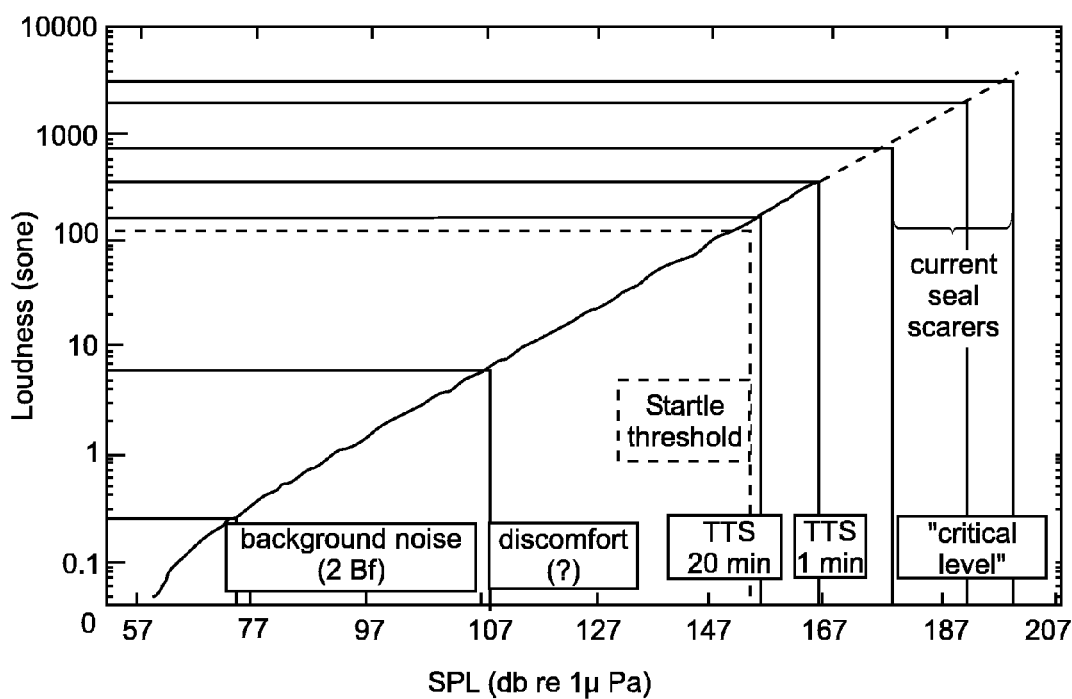
FIG. 4 shows the calculated loudness perception of a 2.5 KHz tone in a harbour seal.

FIG. 4 shows the calculated loudness perception of a 2.5 KHz tone in a harbour seal. A doubling of the loudness in sones reflects a doubling in perceived loudness. The discomfort threshold for the harbour seal is taken to lie at about 6 sone, which is slightly lower than that for humans. Pain thresholds are much higher and usually close to SPLs that cause immediate hearing damage. Thus, current ADDs will not cause pain in most cases, but where pain is caused there is also likely to be hearing damage.

In light of the potential hearing damage caused by the ADDs, the inventors recommend that no attempt should be made to increase the source levels of current ADDs or to use devices that emit sound continuously at source levels at the upper end of the dynamic range close to the suspected pain threshold. Additionally, the critical level of 135 dB above the threshold should not be exceeded at reasonable distances from the sound source as the risk of damage originating from single short term exposures is substantially increased above this level.

A safe exposure level for seals would be a perceived sound exposure level of about 126 $Pa^2s^{-1}$ above the threshold, which equals a SEL of 183 dB re 1 $\mu Pa^2s^{-1}$. This was calculated for a 2.5 KHz tone played to a harbour seal.

Recovery times in sound exposure scenarios that do not cause a TTS should be at least ten seconds to avoid accumulation of acoustic trauma. However, acceptable exposure levels should be calculated for the species with the most sensitive hearing in the frequency range used by the ADD.

For the currently available ADDs this would usually be an odontocete rather than a pinniped.

Types of Sounds

Killer whale sounds have been shown to be aversive to seals. However, they equally affect cetaceans, making them an unattractive choice. Use of predator sounds also brings the risk that mammals habituate to the predator sounds and become more vulnerable to real predation.

No data is available on aversiveness perception in marine mammals. However, the hearing system is generally similar among all mammals, in particular the basic functioning of the cochlea and peripheral auditory processing in the brain. The inventors propose that data based on human sound perception would be a good starting point for the investigation of aversiveness perception in marine mammals.

Two different versions of ADDs are proposed. The first version uses the mammalian startle response to elicit a flight. Startle sounds have to have a short rise time, have a sensation level of at least 90 dB above the hearing threshold, and be relatively short (i.e. less than 200 ms). Additionally, sound should be broadband. These kinds of sounds elicit a startle and flight response.

The startle response is a physiological reflex to sound levels and has been shown to occur at specific source levels above and hearing threshold of a particular species. It is elicited through a relatively simple reflex and the underlying mechanisms are likely to be shared by mammals. The startle response is usually followed by a flee response in a direction away from the source of the sound. The startle response has been well documented in rats, but mostly for experimental purposes to study the neuronal basis of simple learning behaviours (e.g. sensitisation and habituation). It has not been used in practice for a mammal deterrent device, and has furthermore never been applied to the deterrence of marine mammals in a fish farm or any other practical environment.

The second version uses aversive sounds that were designed on the basis of a model describing what makes sound pleasant or unpleasant for humans, see Zwicker, E. & Fastl, H. (1990), *Psychoacoustics—Facts and Models*, Springer-Verlag, New York. The four parameters that are mentioned in the model that predicts what makes sounds unpleasant in humans are high sharpness, high roughness, low tonality and high loudness. In addition, specific frequency differences within complex sounds have been found to be unpleasant (e.g. frequency differences/ratios that constitute unpleasant musical intervals).

To maximise the effects caused by sharpness, higher-frequency signals have to be used, and so sharpness is discarded as a parameter for seal-specific ADDs. However it could be used as a parameter in an ADD for deterring cetaceans; in particular odontocetes (toothed whales) with good high frequency hearing.

Low tonality can be achieved using square-wave sounds as carrier signals that do not have very tonal characteristics (for example when compared with a pure sine wave tone).

In order to maximise roughness the carrier signal should be frequency-modulated. A frequency modulation of between 5 Hz and 200 Hz would be suitable for ADDs, with a potential optimum of about 70 Hz (corresponding to the frequency modulation most effective in humans to cause an unpleasant stimulus).

Modulation depth of the signal can be narrowband or wideband, ranging typically between 10% and 150%. As a particular example, a 50% modulation depth of the centre frequency of the carrier signal may be useful.

As mentioned above, the frequency composition of complex sounds is also a contributing factor to the aversiveness of a sound. Complex sounds that consist of partials (individual sine wave components) having frequency differences falling within 25% of a critical bandwidth are perceived as dissonant in humans. When modelling the hearing system as a series of band-pass filters, the critical bandwidth reflects the bandwidth of each individual filter.

Some examples of suitable sounds that can be synthesised are as follows:
1. 70-Hz frequency modulated square-wave signals with a carrier frequency of 500 and 527 Hz. Both tones are mixed (presented at the same time) resembling the musical interval of a minor second. Modulation depth was 50%.
2. 70-Hz frequency-modulated square-wave tones with carrier frequencies of 500 and 507 Hz. Both tones are mixed (presented at the same time) resembling a frequency distance of 25% of the critical band for a harbour seal (*Phoca vitulina*). Modulation depth was 50%.
3. 70-Hz frequency modulated square-wave tones with a carrier frequency of 500 Hz.
4. A combination of the first three sounds: This sound would consist of elements of variable length (100 ms to a few seconds). Some of these elements are presented as FM sweeps covering a frequency range from 200 Hz to 4 kHz.

It is to be appreciated that these four examples are for illustration purposes only.

It has also been observed that broadband signals are perceived to be louder than narrowband signals when played at the same source level, and this can be used to increase the perceived loudness without actually increasing the source level. Thus, for both startle and aversive sounds, a signal is intentionally constructed to be as broadband as possible within the designated frequency band.

Preventing Habituation

Motivational factors clearly influence responses to sound exposure. An acoustic deterrent tested on well fed captive seals gives better performance results than one tested on foraging seals around real fish farms, as food motivation would give seals a higher tolerance for loud sounds.

Habituation could be avoided or at least delayed by a triggering method which only plays sounds when seals approach. This can be triggered by the detection of a seal itself or by the analysis of changing patterns of motion in the swimming of the fish indicating that a predator is present. Using highly variable sound types should also prevent habituation, but no empirical data for animals in the feeding context are available to support this.

Studies in the startle response of rats have indicated that habituation is not caused by an increase of the perceptional threshold eliciting the startle response, but by a change of the slope of the function of the difference between an input signal (SPL) and an output signal (magnitude of response).

This supports the dual process theory of habituation meaning that the response to a repeated stimulus is influenced by a decreasing (sensitisation) and increasing (habituation) component. For ADDs this would mean that the source levels would have to be increased beyond the initial levels to yield the same response as before habituation occurred. Given the abovementioned problems associated with high SPL noise, this is not a good solution.

Ideally, one would aim to replace habituation by sensitization to a sound stimulus. This could be achieved by using high intensity sound intermittently to sensitize a low intensity stimulus. Sensitization through electric stimulation is not feasible since the seal would have to be very close to yield an effect.

It is preferable however that the acoustical stimulus is repeatedly negatively reinforced by an aversive stimulus. Classical conditioning paradigms could be used here. An unconditioned stimulus (e.g. startle sound) causing an unconditioned response (e.g. startle response) is associated with a conditioning stimulus (e.g. an artificial acoustic signal with no biological meaning) which is then able to cause the conditioned response consisting of the same behavioural pattern as the unconditioned response (e.g. startle and flee).

Confirmation of Theory

To confirm the theoretical improvements in acoustic deterrence introduced above, the inventors carried out a number of experiments. To begin with these experiments were conducted in a controlled environment with captive seals building up to a field trial of the invention at a fish farm in which an Acoustic Deterrent Device (ADD) of any type had never been used.

Sensitization to Startle Sounds in Captivity

Figure 7:
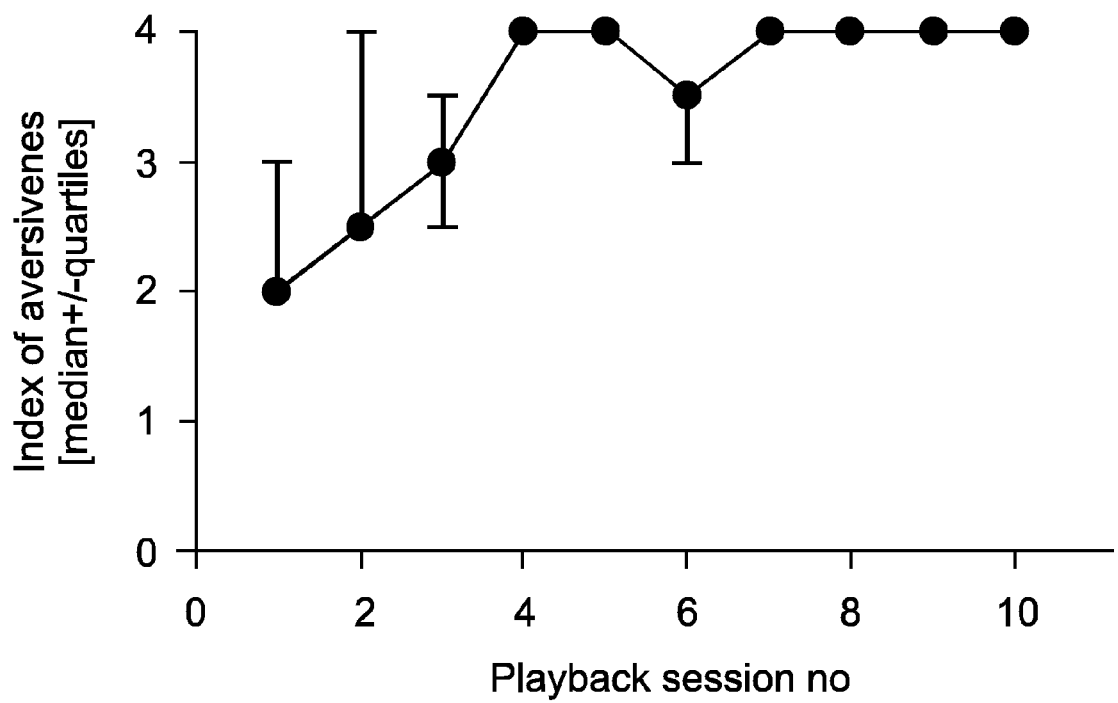
FIG. 7: shows a graph of results from experiments with captive seals showing the seals exhibited a startle response and sensitised to a transmitted sound meaning that aversive responses increased over time.

Experiments with captive seals were carried out under strong food motivation elicited by the presence of an underwater feeding station. The majority of the seals showed a clear startle response as indicated by neck twitches in response to the chosen stimulus (filtered noise pulse 450 Hz and 1.9 kHz; peak frequency 1 khz, received level 170 db re 1 µPa). The startle response was followed by a flight response. After several exposures seals also started to haulout (leave the water) in response to the sound. These flight responses and the time the animal spent on land built up over time with all animals being very reluctant to enter the pool or come close to the feeding station by the end of the experiments. Aversive behaviour was quantified by an index of aversiveness which was a cumulative index of occurrence of a series of aversive behaviours. Depending on whether all or none of the following behaviours occurred the index ranged from 0 (not aversive) to 4 (highly aversive):

Fish catch prevented.
Seal suddenly turns away from speaker.
Escape/Flight response: seal increases distance to speaker at speeds of more than 3 m/s.
Hauling-out for at least 30 s after flight response As shown in FIG. 7 aversive responses increased over time meaning that animals did not habituate but sensitised to the sound. This confirms the theory and is a highly desirable outcome for an acoustic deterrence method. No previous study on acoustic deterrence devices has demonstrated any kind of sensitisation to an acoustic stimulus.

Field Trial on Fish Farm

An ADD was used comprising of a Lubell® 9162 loudspeaker, a Cadence® Z9000 stereo high-power car amplifier, a Panasonic® SL-5120 CD player and a car battery installed in a waterproof aluminium box. The speaker was deployed at 17 m depth, which was about 2 m below the deepest part of a cage in order to avoid sound shadow effects by the fish in the near field. A startle stimulus comprising of a 200 ms long noise pulse with a rise time of 5 ms and peak frequency of 950 Hz, was used. The −20 dB bandwidth spanned approximately two to three octaves with the average minus 20 dB power points being at 450 Hz and 1.9 kHz. The startle pulse was paired with a substantially weaker pre-sound comprising of a 3 Hz frequency modulated 1.2 s long sine wave pure tone. The sweeps caused by the frequency modulation covered a frequency range from 700 Hz to 1.3 kHz and the pre-sound ended 2 s before presentation of the startle pulse.

The noise pulses were played at varying intervals ranging from 2 s to 40 s with an average of 2.4 pulses per minute. In order to make the sound pattern less predictable the signals were arranged digitally into 4 different playback tracks each of which was 1.5 hours long. These playback tracks were assigned to different playback days and played in loop mode from the CD player. Given the signal length of 200 ms, the effective duty cycle of the ADD was 0.08%. The source level of the ADD was adjusted to 180 dB re 1 µPa. Experiments were carried out in sea states less than 3 (slight, 0.5 to 1.25 m wave heights). Good weather days were chosen to use as either a control day with the equipment in place but no playbacks or an exposure day in which the stimulus was played as described above. Average observation periods were 3.5 hours (SD=0.96) on control days and 3.4 hours (SD=0.94) on days with sound exposure. The longest observation period was 5 hours, the shortest 1.5 hours. This protocol resulted in a total of 113 hours of observation with 58 h during sound exposure and 55 h during control periods. Observations were balanced so that tidal state, sea state and time of day were the same for control and sound exposure observation periods.

During observation periods, visual scans were conducted by two observers. One observer was scanning by eye while the other observer was using binoculars. If one of the observers detected a porpoise or seal, bearings and surface positions for each surfacing bout were logged. A group was tracked until no resurfacing occurred 15 min after the last surfacing had been logged. Group and track ID was therefore defined as a consecutive line of surfacings that were not separated by more than 15 min. If another group or species was spotted by the observers while tracking a group, surfacings were logged for both groups.

Figure 5A:
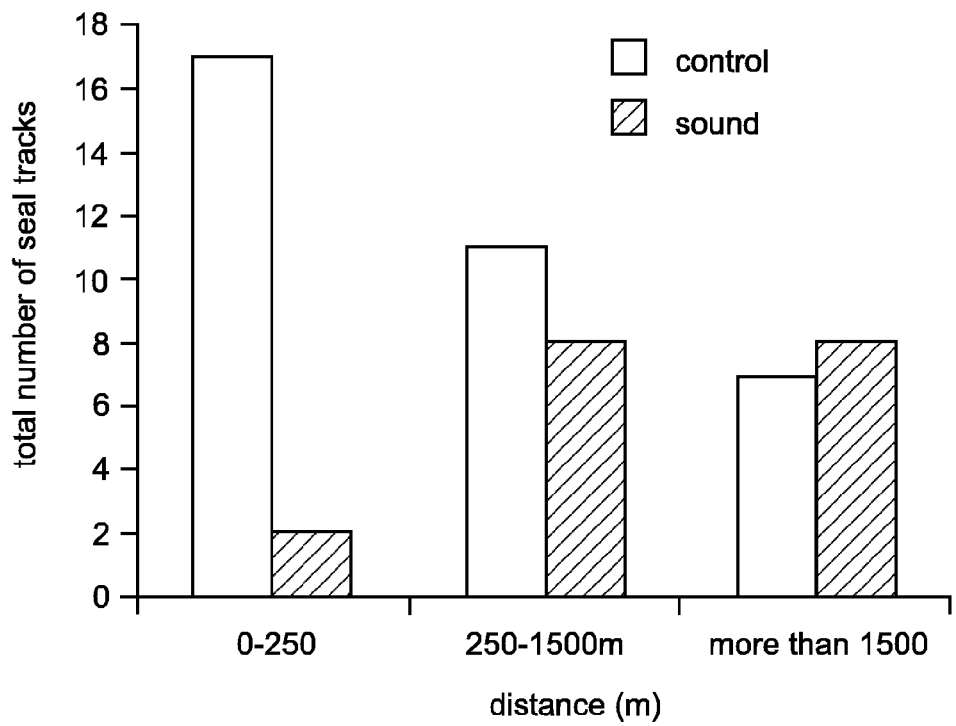
FIG. 5 shows a comparison of seal sightings during field trials on both control days and sound days for (a) closest approaches and (b) average distance from an Acoustic Deterrent Device.
Figure 5B:
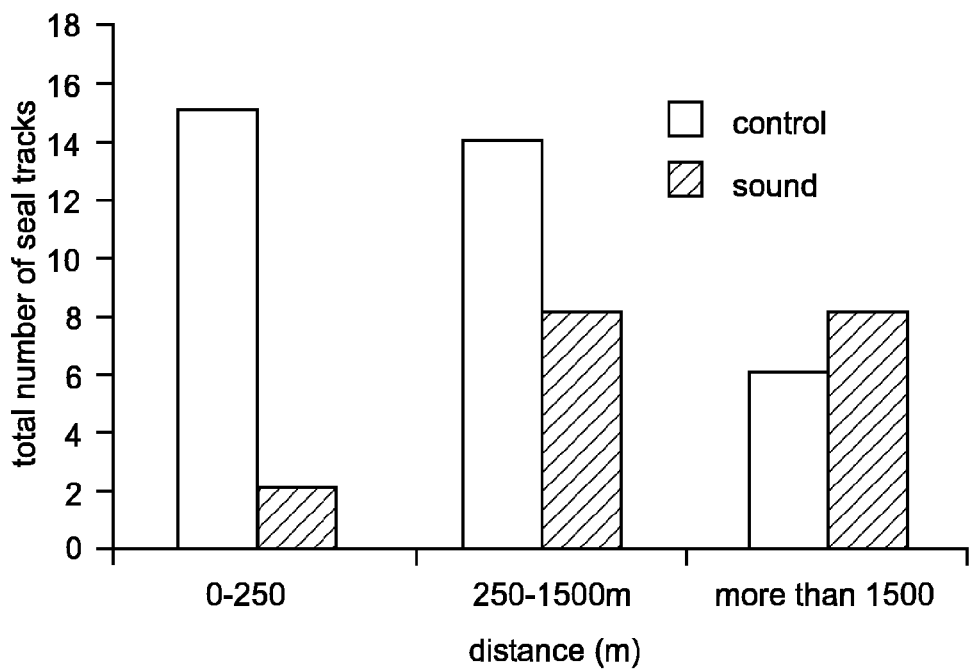
Figure 6A:
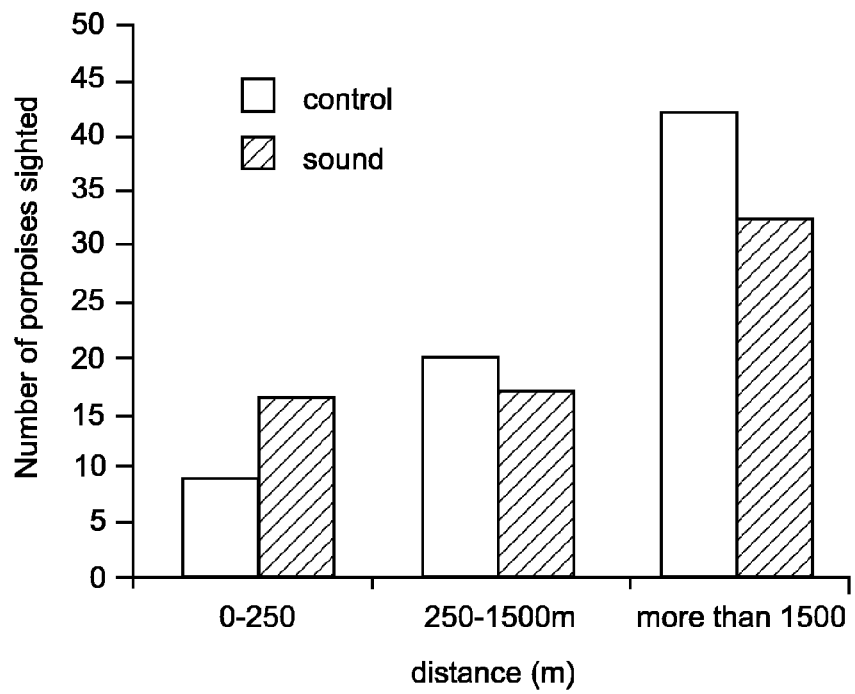
FIG. 6 shows a comparison of porpoise sightings during field trials on both control days and sound days for (a) closest approaches and (b) average distance from an Acoustic Deterrent Device.
Figure 6B:
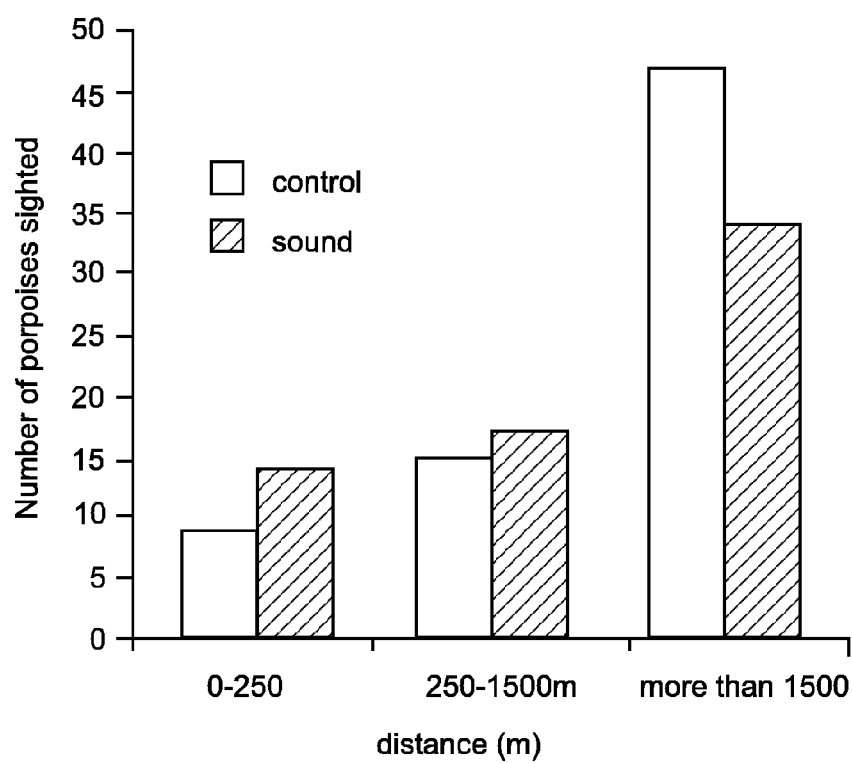

FIG. 5 and FIG. 6 are graphs showing a comparison of seal (FIG. 5A and FIG. 5B) and porpoise (FIG. 6A and FIG. 6B) sightings on "control" days, on which no sounds were played, and "sound" days, on which the sounds described above were played for (A) closest approaches and (B) average distance from the ADD. The results show that seals clearly showed an avoidance response up to 250 m in their closest approaches (FIG. 5A) and in the average distance to the device (FIG. 5B) while porpoises showed no significant differences in either response variable. Porpoise groups were regularly seen swimming between the cages of the fish farm and one porpoise group approached the ADD as close as 7 m during sound exposure. The closest ever observed approach of a seal was approx 50 m during sound exposure.

The field trial showed that an ADD incorporating "startle" sounds did not have a negative effect on harbour porpoise distribution but was effective in reducing the number of seals in the vicinity of the fish farm. This fish farm was unusual in that minke whales used the sea loch with the farm occasionally. The startle sound did not have any effects on minke whales. In the experiments, they were exposed to received level of up to 125 dB re 1 µPa. In fact, considerably more minke whales were spotted on sound exposure days, as oppose to days in which no sound was played as a control level, confirming that the animals do not show a strong avoidance response to the ADD sounds as disclosed herein.

Other Applications

Various improvement and modifications may be made to the above without departing from the scope of the invention. In particular, while embodiments have been described with reference to marine environments, it is to be appreciated that the principles of the invention can be equally applied for the deterrence of any mammal, in sea or on land. The economic advantages applicable to the fish farm industries could be equally applicable to other industries like game reserve control and estate management.

The invention claimed is:

1. A method of deterring mammals comprising configuring an acoustic deterrent system to emit an acoustic signal, said acoustic signal having a level sufficiently high, and rise time sufficiently short to elicit an acoustic startle response reflex in said mammals, wherein incurring an acoustic startle response comprises the steps of:

selecting a target order, family, genus or species of mammals to be deterred;

selecting a received level at a predetermined level above a representative hearing threshold of the targeted mammals;

transmitting an acoustic signal from a transmission point at a source level required, taking into account transmission loss, to create the selected received level at a predetermined distance from the transmission point, and wherein a secondary conditioning sound is made to condition the mammals to avoid the main stimulus.

2. A method as claimed in claim 1, wherein the predetermined level is between 90 and 125 dB above the representative hearing threshold.

3. A method as claimed in claim 1, wherein the acoustic signal has a duration about as long as the acoustic integration time specific to the targeted mammals auditory system.

4. A method as claimed in claim 1, wherein the acoustic signal has a duration of less than 200 milliseconds (ms).

5. A method as claimed in claim 1, wherein the acoustic signal has a rise time of less than 20 ms.

6. A method as claimed in claim 1, wherein the acoustic signal is as broadband as possible within the designated frequency range.

7. A method as claimed in claim 1, wherein the acoustic signal comprises frequency components at which the aural sensitivity of the targeted mammals is greater than that of selected other animals.

8. A method as claimed claim 1, wherein the acoustic signal uses frequency band between 500 Hz and 2 kHz for the deterrence of seals or other pinnipeds.

9. A method as claimed in claim 1, wherein the mammals to be deterred comprise sea mammals including pinnipeds, most preferably seals; or cetaceans.

10. A method as claimed in claim 1, wherein the mammals to be deterred comprise land mammals.

11. A method as claimed in claim 1, wherein the secondary conditioning sound comprises a sound of centre frequency 1 KHz, modulation rate 250 Hz and duration 1.2 seconds with two modulation cycles.

12. A method as claimed in claim 1, wherein the conditioning sound is played between 500 ms and 5 s before the main acoustic signals on selected occasions.

13. A method as claimed in claim 1, wherein the acoustic deterrent system comprises a signal transducer arranged to transmit said acoustic signal.

14. A method as claimed in claim 1, wherein the acoustic deterrent system comprises a control unit, a power source, amplifier and arranged to produce said acoustic signal.

15. A method as claimed in claim 14, wherein the acoustic deterrent system includes a control unit that operates under the control of control software executable on a computer.

16. A method as claimed in claim 15, wherein the control software is stored on a computer readable medium.

17. A method as claimed in claim 1 wherein the predetermined level above the representative hearing threshold is between 95 and 125 dB re 1 µPa and the rise time of the sound is 1-20 ms.

18. A method of deterring marine mammals comprising configuring an acoustic deterrent system to emit an acoustic signal, said acoustic signal comprising an aversive sound whose characteristics are chosen based on characteristics that are unpleasant to humans, wherein the aversive sound is selected to have one or more of the following psychophysical features: low tonality; high loudness; high sharpness, and wherein a frequency modulation with a modulation frequency of about 70 Hz is applied to a carrier signal.

19. A method as claimed in claim 18, wherein the frequency modulation has a modulation depth of between 10 and 150%, preferably 50% of the centre frequency of the carrier signal.

20. A method as claimed in claim 18, wherein the aversive sound has a sound pressure level of at least 70 dB above the hearing threshold of the targeted mammals, most preferably at least 80 dB above the hearing threshold of the targeted mammals.

21. A method as claimed in claim 18, wherein the aversive sound is of a complex form and comprises partials that fall within 25% of the critical bandwidth of the hearing system of the targeted mammals.

22. A method as claimed in claim 18, wherein when cetaceans are to be deterred, the acoustic signals are close, to the upper frequency edge of the hearing range in order to increase sharpness.

23. A method as claimed in claim 18, wherein the acoustic signal is as broadband as possible within the selected frequency band in order to increase loudness without increasing the actual sound pressure level.

24. A method as claimed claim 18, wherein the aversive sound comprises frequency components at which the aural sensitivity of the targeted mammals is greater than that of selected other animals.

25. A method as claimed in claim 18, wherein the acoustic signal comprises one or more frequency components between 500 Hz and 2 kHz for the deterrence of seals or other pinnipeds.

26. A method as claimed in claim 18, wherein sound exposure time and level are determined such that the resulting sound does not cause a temporary or permanent hearing threshold shift in target and non-target species.

27. A method as claimed in claim 25, wherein the sound exposure level is 120 dB re 1 $\mu Pa^2 s^{-1}$ above the hearing threshold of the targeted mammals.

* * * * *